United States Patent
Frohnmeyer et al.

(10) Patent No.: US 6,203,672 B1
(45) Date of Patent: Mar. 20, 2001

(54) CONTROL OF THE SURFACE ROUGHNESS OF MAGNETIC DISK

(75) Inventors: Edgar Frohnmeyer, Worrstadt; Klaus Rij, Mainz; Stephan Spinzig, Wollstein; Irene Springer, Gustavsburg, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/215,101

(22) Filed: Dec. 18, 1998

(30) Foreign Application Priority Data

Dec. 18, 1997 (DE) ............................................. 197 56 410

(51) Int. Cl.$^7$ ..................................................... H01H 29/00
(52) U.S. Cl. ...................... 204/192.2; 427/129; 427/130; 427/131
(58) Field of Search ..................... 204/192.2; 427/130, 427/131, 129

(56) References Cited

U.S. PATENT DOCUMENTS

| | | | |
|---|---|---|---|
| 4,287,225 | 9/1981 | Kneller et al. | 427/48 |
| 4,698,251 | 10/1987 | Fukuda et al. | 428/64 |
| 4,735,840 | 4/1988 | Hedgcoth | 428/65 |
| 4,816,119 * | 3/1989 | Rauch et al. | 204/29 |
| 4,973,496 | 11/1990 | Kruger et al. | 427/129 |
| 5,441,788 * | 8/1995 | Bloomquist et al. | 428/65.6 |
| 5,635,037 * | 6/1997 | Chu et al. | 204/192.35 |

FOREIGN PATENT DOCUMENTS

0567748 A1   3/1993 (EP) ................................. G11B/5/64

OTHER PUBLICATIONS

IBM TDB, vol. 34, No. 5, Oct. 1991, "Controlled Surface Texturing of Materials", pp. 381–382.
Research Disclosure n289, May 1988, Surface Texturing of Thin Film Magnetic Recording Media with Evaporated Undercoat.

* cited by examiner

Primary Examiner—Stevan A. Resan
(74) Attorney, Agent, or Firm—G. Marlin Knight

(57) ABSTRACT

A process is described for texturing the surface of magnetic disks which permits control of the micro-roughnesses of the surface through selective oxidation of certain areas of the surface of the substrate used for magnetic disks. For example, islands of oxidation can be produced by rinsing the substrates in oxygen containing water at an elevated temperature. The islands provide preferential nucleation sites for thin film metal deposition, e.g. a chromium underlayer, to form nodules. These nodules affect the micro-topography of the final magnetic disk.

18 Claims, 2 Drawing Sheets

CONTROL OF THE SURFACE ROUGHNESS OF MAGNETIC DISK

BACKGROUND OF THE INVENTION

1. Field of the Invention

The present invention relates to the manufacture of magnetic disks. In particular, it relates to a process for controlling the micro-roughness of the surfaces of magnetic disks.

2. Description of Related Art

Magnetic disks are data storage devices with a very large storage capacity. For example, 400 million characters (bytes) can be stored on a magnetic disk of about 95 mm diameter. Besides the high storage density, the disks must also exhibit exact mechanical and also certain tribological properties. In subsequent practical use, the disks move at 5400 revolutions per minute. This means that the outer edge of the disk reaches a velocity of up to 100 km/h, while the read/write head is less than one ten thousandth of a millimeter (<100 nm) from the surface of the disk. Only by observing the greatest precision during manufacture and by statistical process control is it possible to attain these quality requirements.

Because of its high density, a magnetic thin film medium is employed for recording the data in modem high-capacity magnetic disks. In one common arrangement, a magnetic head rests on the surface of the magnetic disk within a circumferential, data-free start-stop zone when the magnetic disk drive is not in use.

An alternative arrangement is the so-called load/unload mechanism, in which the thin film head rests outside the disk and is only guided over the disk surface when it engages in read/write activity.

As a result of the turning motion of the disk a cushion of air which supports the head is formed in both types between the head and the disk.

The conditions prevailing at the boundary layer between magnetic head and disk create a number of tribological problems. In the arrangement described, in which the head rests within the start/stop zone, the magnetic head slides over the surface of the disk until the speed of rotation of the disk is high enough to lift the head. Surface contamination, which can arise from contact of the head with the disk, can lead to abrasion of the corrosion-resistant coatings on the disk and lead to premature failure of the disk or the head.

To reduce abrasion and wear, the magnetic disk is usually provided with a lubricant. However, if the surface of the disk is essentially smooth, the high surface energy of the lubricant leads to greatly increased adhesion between the head and disk (stiction). As a consequence, the force required to turn the disk and lift the head is increased. This can easily lead to deformation and damage to the extremely delicate magnetic head suspension and hence to a failure of the whole drive.

To reduce this undesirable adhesion effect, the surface of the magnetic disk is usually roughened prior to the application of the magnetically active thin film, that is, given a texture so that the head, when it slides over the surface on which it is set down on the disk, comes into contact with very slight roughnesses (asperities) instead of with the smooth disk surface. In such a texturing process, either a number of very small grooves or valleys are ground in the magnetic disk (mechanical texturing) or deliberate elevations are produced by local fusion (laser texturing). Examples of such texturing processes can be found in U.S. Pat. Nos. 4,287,225; 4,698,251; 4,735,840 and 4,973,496.

Even with the so-called load/unload arrangement, in which the magnetic head is parked outside the disk, the texture or surface roughness of the magnetic disk plays a great part in respect of a lowest possible magnetically effective gap between magnetic head and disk.

IBM TDB Vol. 34, No. 5, pp. 381–382 describes the use of plasma processes for the manufacture of random nano-structures on a surface.

EP-A-0 567 748 discloses the manufacture and use of rough silicon surfaces. The manufacture of such surfaces with a control of the roughness density comprises a) an LPCVD (Low Pressure Chemical Vapor Deposition) process in the region of 1–5 mTorr and b) the use of a surface of thermal $SiO_2$, which undergoes relatively little reaction with $SiH_4$ at a temperature in the region of 500–600° C. A silicon surface treated in such a way can be used as a substrate for a magnetic disk of low stiction.

Finally, Research Disclosure n289, May 1988 disclosed the evaporation of a so-called "metal undercoat" onto a substrate to achieve texturing. The evaporated metal film produces a uniform micro-roughness, so that the magnetic layer and coating subsequently applied reproduce this roughness. In a particular embodiment, chromium (Cr) is evaporated onto an aluminum-magnesium alloy substrate which supports a nickel-phosphorus surface film.

The aforementioned processes have, however, the disadvantage that they do not permit precise control of the micro-roughness of the surface and/or are very time-consuming and therefore cost-intensive.

In the manufacture of magnetic disks for desktop and server drives, the substrate predominantly used is NiP coated aluminum, to which metal atoms are then applied by sputtering. Chromium is particularly preferred as the material for the underlayer deposited on the substrate. During the sputtering process, the metal atoms grow faster on those regions of the surface of the magnetic disk which energetically favor the growth. This applies to regions which have a thicker oxide layer than their surroundings (oxide islands). Preferential oxidation takes place on regions of special topography (elevations, grooves, scratches, etc. at the atomic level) or in regions with a particular surface composition, which is thermodynamically favorable to metal growth. At these places at which the preferential growth takes place, small metal atom aggregations, the so-called nodules, are produced. These nodules are dressed by the layers (magnetic layer, protective layer) subsequently applied and result in approximately hemi-spherical protrusions on the finished disk surface.

The size and density of the nodules have a marked influence on the properties of the magnetic disk. If the nodules are relatively small and numerous (diameter 10–20 nm), the surface obtained is microscopically relatively smooth and homogeneous, allowing a very low flying height for the magnetic head and hence an efficient magnetic interaction between head and disk. However, if the head comes to rest on a disk with very small nodules, the high adhesion forces can result in an increase in stiction.

Large nodules (e.g. 50–60 nm ) with a low density of distribution, on the other hand, increase the magnetically active gap between head and disk and thus reduce the attainable write density. In addition, they produce asperities which increase the tribologically caused wear of the disk, coupled with scaling on the magnetic head, and so shorten the service life of the disk drive.

On the other hand, if the head/disk interface used tends to increased stiction, for example, through organic contamination or very smooth head surface, then large nodules, by reducing the effective contact surface of the head with the disk, act to reduce the head/disk adhesion forces.

A further negative aspect of large nodules is the danger of surface damage in the post-sputtering cleaning processes, which act abrasively on asperities and lead to damage to the topmost protective layer of the disk. This greatly reduces the corrosion resistance of the disk to the action of moisture and harmful substances.

There is therefore great interest in being able to control the size of the nodules as precisely as possible, i.e. in bringing them into a region which, on the one hand, reduces the danger of stiction and, on the other hand, minimizes the magnetically active distance in respect of the maximum possible write/read performance.

SUMMARY OF THE INVENTION

Although the present invention can also be employed for the so-called load/unload arrangement, only the use in those applications where the magnetic head rests in a start/stop zone on the disk are discussed below.

It is an object of the present invention to provide a method which will permit control of the size of the nodules and thus deliberately influence the micro-roughness of the magnetic disk.

This and other objects of the invention are achieved by a method for surface-texturing of magnetic disks comprising a step of sputtering metal atoms on the surface of the magnetic disk and is characterized in that, prior to the sputtering process, certain regions of the surface of the magnetic disk are selectively oxidized at elevated temperature.

Further advantageous embodiments of the method in accordance with the invention are set out in the claims.

The process in accordance with the invention enables the surface roughness of the magnetic disk caused by the nodules to be deliberately controlled when desired. This has the advantage of targeted reduction of stiction, increase in magnetic performance and improvement of the corrosion-resistance of the magnetic disk.

BRIEF DESCRIPTION OF THE DRAWINGS

The method in accordance with the invention is further described with reference to the drawings.

These show.

DETAILED DESCRIPTION OF THE PREFERRED EMBODIMENT

Figure 1:
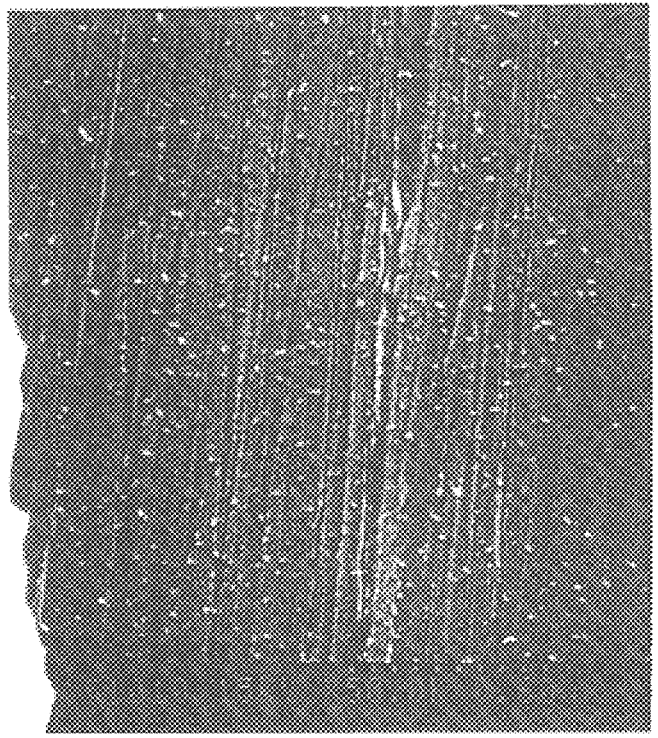
FIG. 1 the surface of a substrate with normal oxygen content rinsed at 60° C.

In the manufacture of desktop and server magnetic disks an NiP-coated Al substrate is textured mechanically, for example, with a diamond suspension (producing scoring), vigorously washed (pre-sputter wash) and then coated in a sputter process with metal films and a protective film of diamond-like carbon (carbon overcoat). After further cleaning the disk is then lubricated and finally tested magnetically and mechanically.

In a washing step preceding the sputter process proper the NiP substrate surface is etched using an aggressive cleaner (for example, a flux or phosphoric acid-containing solution), as a result of which texturing residues and the entire surface oxide film are removed. This is followed by more brush and rinse steps. The last pre-wash step comprises immersion of the cleaned substrate in hot water, thus warming the substrate sufficiently so that it dries in a very short time.

The substrate surface is oxidized as a result of the oxygen dissolved in the rinse water, forming superficial oxides ($NiO_x$, $NiPO_x$). Since this oxidation does not take place uniformly but preferably at places which exhibit corresponding topographical features, such as grooves, scratches, etc., or which have a particular surface composition, where there are thermodynamically favorable conditions, the result is to form so-called oxide islands, which have a higher oxide content than their surroundings. The oxide islands subsequently react preferentially with the elementary, highly reactive sputtered metal. Thermodynamically very stable oxides, for example, $Cr_2O_3$ when chromium is used as sputter metal, are thus obtained which form nucleating points for further metal growth.

The invention envisages precise control of the oxygen content of the aqueous medium in the final rinse process before the sputtering process itself, thus controlling the oxidation taking place on the surface of the substrate. In this way, selective oxidation of preferred regions of the surface is obtained, namely those on which grooves, scratches, etc., i.e. topographical irregularities, appear or corresponding thermodynamic requirements are met (oxide islands). For this, the rinsing material must be at an elevated temperature, which is in the range from about 30 to 80° C., preferably 60° C.

Untreated water (i.e. no disinfection through ozone treatment, etc.) has an oxygen content at 60° C. of about 4–5 mg/l. A reduction of the dissolved oxygen content of the rinse water to values in the region of 0–4 mg $O_2$/l, for example, by degassing (introducing nitrogen) leads to a significant slowing down of the oxidation of the surface of the substrate during contact with the rinse water. The formation of regions with a heavier oxide coating is then incomplete and the result is either no oxide islands or only very small and not very pronounced islands. On finally drying the substrate in a standard atmosphere a thin and very homogeneous oxide coating is formed on the substrate surface as a result of the action of atmospheric oxygen.

For the metal atoms arriving at the surface of the substrate during the subsequent sputtering process no region with an increased thickness of oxide is visible and many small metal growth points are formed which then lead to the formation of small nodules (diameter about 10 nm) with very high surface density.

In addition, it is possible to effect homogenization, i.e. a reduction in the nodule size distribution, if the substrate is subjected to hot air drying after the rinsing process. As a result of the action of the hot air, a particularly uniform growth of the surface oxide layer is achieved, leading again to the inhibition of a preferred metal growth in the subsequent sputtering process so that numerous small nodules of similar size are formed.

Increasing the oxygen content in the rinse medium to values in the region of about 5–10 mg $O_2$/l, for example by switching off the degassing and/or optionally introducing additional oxygen, on the other hand, causes the formation of clearly visible oxide islands on the substrate surface. These islands have an approximate diameter of $\leq 10$ nm and a height of about 5–10 nm. In the subsequent deposition process very large nodules (50–60 nm diameter) with a low density through preferential growth of the metal atoms on the oxide islands can be generated.

EXAMPLE

In order to demonstrate the effectiveness of the present invention, substrates and finished processed magnetic disks which had been treated with different amounts of oxygen in the final rinsing step of the substrate washing process were compared with one another. The reduction of the oxygen content in the rinse water was effected by gassing with nitrogen in a conventional degassing unit. The "normal", i.e. un-degassed rinse water, served as a reference. The temperature of the rinse water was 60° C. in both cases.

The substrate was first textured and then washed. The complete washing process consisted of an etching process and a sequence of brushing and rinsing steps.

The topographical surface characterization was carried out using high-resolution scanning electron microscopy (SEM) at a magnification of ×50000.

Figure 2:
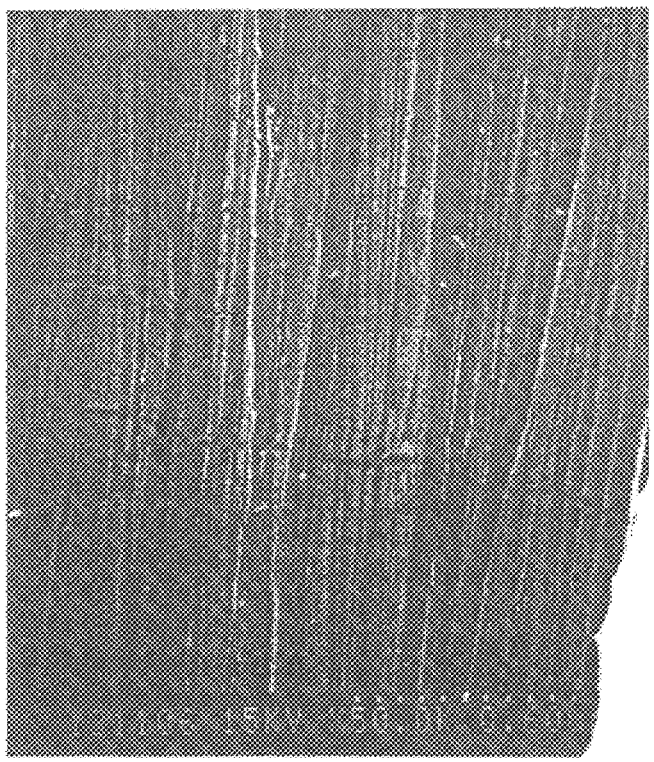
FIG. 2 the surface of a substrate rinsed with low oxygen water.

FIG. 1 shows the surface of a substrate rinsed with water at 60° C. having an oxygen content of about 8 mg $O_2$/l and FIG. 2 the surface of a substrate rinsed with water having an oxygen content of about 1.7 mg $O_2$/l.

A "normal" oxygen content is to be understood in this example to be a value of about 8 mg $O_2$/l. "Low oxygen" water in this example means a value of approximately 2 mg $O_2$/l.

It can be clearly seen that the surface rinsed with the higher oxygen content shows smaller protuberances (nodules) with a diameter of a maximum of 10 nm, while on the surface rinsed with degassed water these protuberances are completely lacking or are no longer detectable with the SEM.

The present substrates were then provided with a Cr layer (30 nm thick), a Co/Pt/Cr layer (40 nm thick) and a carbon layer (10 nm thick) in subsequent sputtering processes and lubricated.

Figure 3:
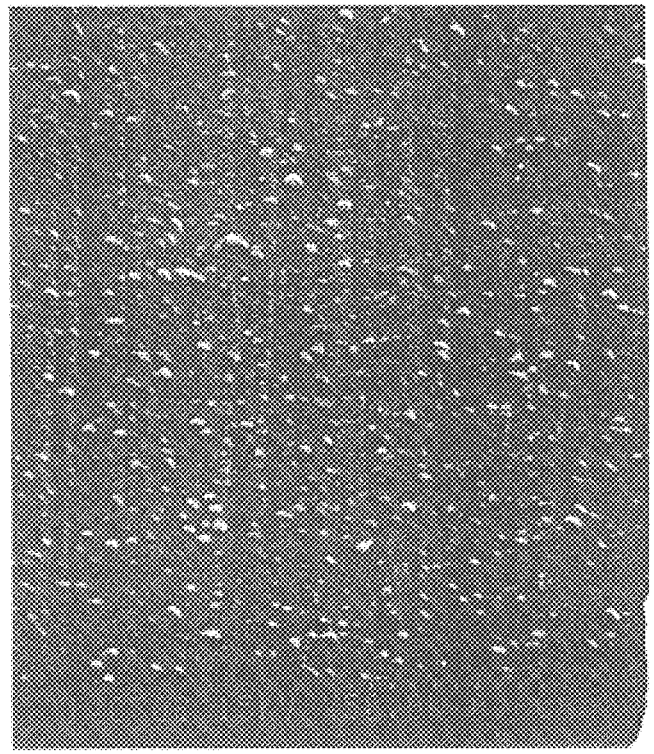
FIG. 3 the surface of a magnetic disk prepared from a substrate shown in FIG. 1.

FIG. 3 shows the surface of a magnetic disk produced from a standard substrate, i.e. one processed with oxygen-containing rinse water. Hemi-spherical protuberances (nodules) with a diameter of 50–60 nm are clearly recognizable. The density of these nodules is broadly comparable with the density of the corresponding substrate protuberances.

Figure 4:
FIG. 4 the surface of a magnetic disk made from a substrate shown in FIG. 2.

FIG. 4 shows the surface of a magnetic disk made from a substrate treated with degassed rinse water. It exhibits no protuberances detectable with the SEM and thus correlates with the corresponding completely smooth substrate surface.

The difference between the two disk surfaces is significant and well reproducible. The substrate treated with degassed warm water provides, apart from the texture roughness, completely smooth surfaces, while the substrates rinsed with warm water having a higher oxygen content exhibit immediately after the washing process small protuberances (oxide islands) on the surface, from which relatively large nodules are produced during the subsequent sputtering process.

In this way, the surface roughness of the magnetic disks can be precisely adjusted by controlling the oxygen content of the rinse water before the sputtering process.

We claim:

1. Method for producing a magnetic disk, comprising the steps of:
    adjusting a dissolved oxygen content of a rinsing liquid to a selected percentage range;
    rinsing a substrate with the rinsing liquid to allow the dissolved oxygen to oxidize portions of the substrate surface to form oxide islands;
    sputtering a layer of metal atoms onto a surface of the substrate magnetic disk, and
    sputtering one or more thin films onto the surface of the substrate including a magnetic thin film.

2. The method of claim 1 wherein the step of sputtering a layer further comprising forming nodules of metal on the oxide islands.

3. The method of claim 2 wherein the step of adjusting the dissolved oxygen content of a rinsing liquid comprises reducing the dissolved oxygen content of water.

4. The method of claim 2 wherein the step of adjusting the dissolved oxygen content of a rinsing liquid comprises increasing the dissolved oxygen content of water.

5. The method of claim 2 wherein the nodules have a diameter of approximately 10–20 nm.

6. The method of claim 2 wherein the nodules have a diameter of approximately 50–60 nm.

7. The method of claim 2 wherein the sputtering a layer of metal atoms further comprises sputtering chromium atoms.

8. The method of claim 2 further comprising hot air drying the substrate after the rinsing step.

9. A method of producing magnetic disks comprising the steps of:
    oxidizing portions of a surface of a substrate by rinsing the substrate with a liquid containing a selected amount of dissolved oxygen, the selected amount of dissolved oxygen being chosen to form oxide islands while allowing portions of the surface to remain unoxidized;
    sputtering a metal onto the surface forming nodules at oxide islands; and
    sputtering one or more thin film layers including a magnetic layer.

10. The method of claim 9, further comprising a preparatory step of adjusting the dissolved oxygen content of the liquid to a selected range to achieve a predetermined average oxide island diameter.

11. The method of claim 10 wherein adjusting the dissolved oxygen content is effected by gassing the liquid.

12. The method of claim 10 wherein adjusting the dissolved oxygen content is effected by introduction of oxygen into the liquid.

13. The method of claim 10 wherein the metal comprises chromium.

14. The method of claim 10 wherein the selected range is 0–4 mg oxygen per liter.

15. The method of claim 10 wherein the selected range is 4–5 mg oxygen per liter.

16. The method of claim 10 wherein the selected range is 5–10 mg oxygen per liter.

17. The method of claim 9 wherein a temperature of the liquid is in the range from 30 to 80° C.

18. The method of claim 9 wherein the oxide islands are preferentially formed on irregular topographical features on the surface.

* * * * *